Figures 1, 2, 3, 4:
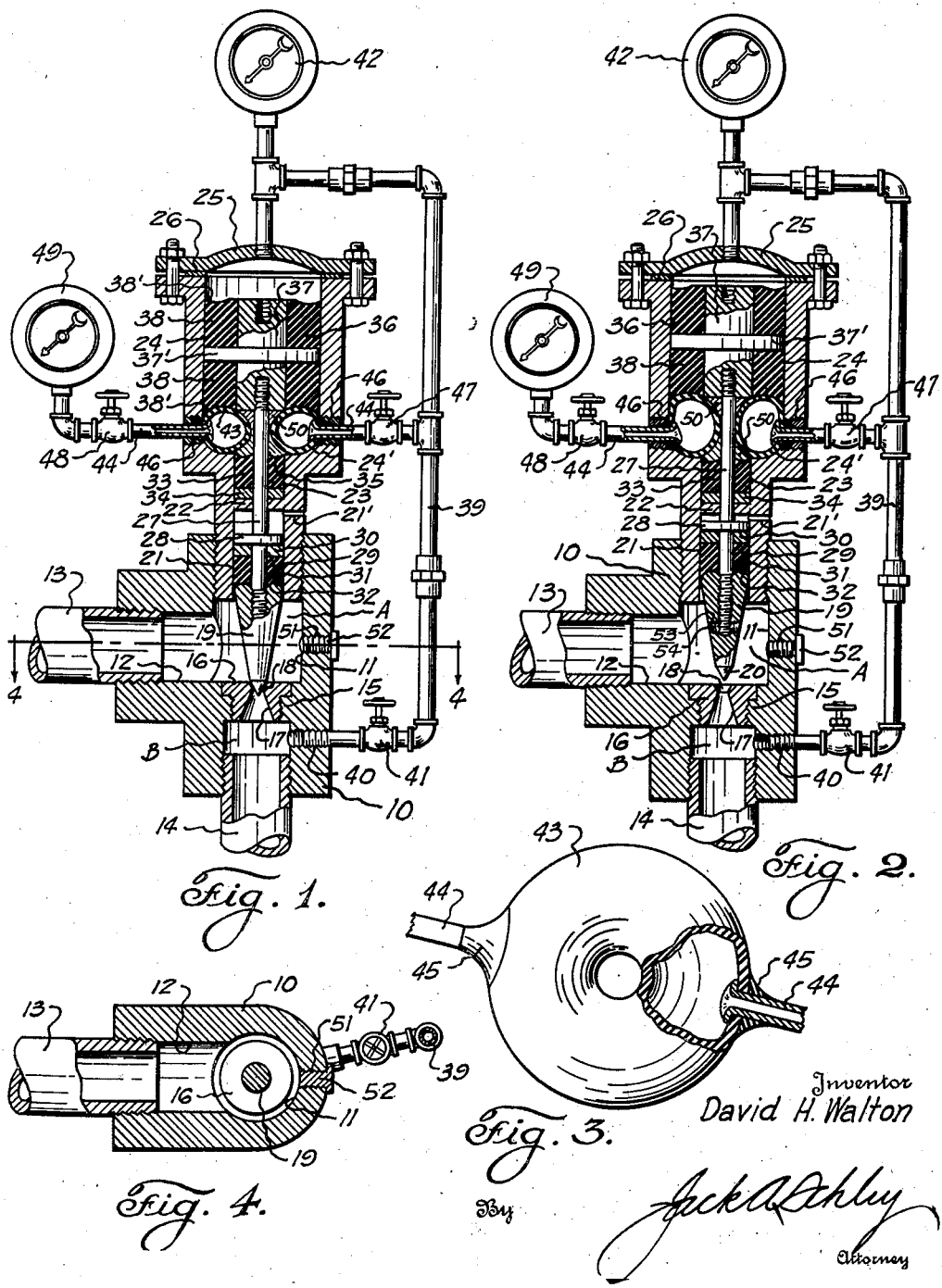

Dec. 15, 1942. D. H. WALTON 2,305,211
REGULATOR
Filed April 28, 1939

Inventor
David H. Walton
By Jack A. Ethly
Attorney

Patented Dec. 15, 1942

2,305,211

UNITED STATES PATENT OFFICE 2,305,211

REGULATOR

David H. Walton, Hobbs, N. Mex.

Application April 28, 1939, Serial No. 270,477

10 Claims. (Cl. 50—34)

This invention relates to new and useful improvements in regulators.

This invention is an improvement of my copending application, filed August 29, 1938, Serial No. 227,384.

One object of the invention is to provide improved means for accurately regulating and controlling the pressure of a flowing fluid, whereby said pressure may be efficiently maintained at a desired predetermined point.

Another object of the invention is to provide an improved pressure regulator having a valve for controlling the pressure of the fluid flowing therethrough, the valve being urged to its open and closed position by a pair of opposed pistons which are exposed to the pressure of said fluid so as to be actuated thereby, the piston which opens the valve being adjustable so as to momentarily resist opening of said valve until a predetermined pressure is built up, whereby the valve is moved at intervals so as to intermit the flow of fluid through said regulator.

An important object of the invention is to provide an improved regulator of the character described, wherein the regulator valve is controlled by pistons which have different cross-sectional areas and to which pressures are applied to actuate the same under a predetermined pressure differential; the device also including pressure responsive means associated with the pistons so that the pressure differential necessary to actuate said pistons may be changed, thereby making said device adaptable for use over a broader range of pressures.

A further object of the invention is to provide an improved regulator having an inflatable member interposed between its pistons for resisting the closing of the regulator valve so as to vary the pressure differential necessary to actuate the pistons and operate said valve.

Still another object of the invention is to provide an improved regulator having pressure-actuated pistons for controlling the movement of the regulator valve, the pistons being operable by different pressures, one by the pressure of the fluid being regulated and the other by the reduced pressure of said fluid, or both, may be operated by the unreduced pressure, whereby the desired pressure reduction may be readily obtained.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a transverse, vertical, sectional view of a pressure regulator, constructed in accordance with the invention and showing the regulator valve in a closed position, Figure 2 is a similar view with the valve in an unseated or open position, Figure 3 is a plan view with a portion shown in section of the inflatable member, and Figure 4 is a horizontal, cross-sectional view, taken on the line 4—4 of Figure 1.

In the drawing, the numeral 10 designates a body having a general T-shape and provided with a circular, vertical bore 11. A lateral port 12 extends from the bore and a fluid line 13, which conducts the fluid to be regulated to the body, is threaded into the outer end of the port. A fluid line 14 is connected in the lower end of the vertical bore 11 of the body and, manifestly, fluid from the supply line 13 enters the port 12 and then flows downwardly through the bore 11 to the outlet line 14. The latter line conducts the fluid to the point of consumption.

An internal, annular flange or ring 15 is formed within the bore 11 of the body, being located below the lateral port 12 and being preferably made integral with the body. The ring is internally screw-threaded to receive a valve seat member 16 which has an external flange at its upper end. When the seat is in position within the ring, the lower edge of the flange rests on the top of the ring, while the upper flat end of the seat member is in horizontal alinement with the bottom of the lateral port 12. An axial bore 17 is formed within the seat member and has its extreme upper end inclined outwardly to provide an annular bevelled valve seat 18. The remaining portion of the bore is conical or flared outwardly toward its lower end, whereby the upper end of said bore is smaller in diameter than the lower end thereof.

The fluid from the supply line 13 enters the lateral port and flows into a space or chamber A above the seat member 16 and then passes through the bore 17 of said member. The bore 17, being smaller than the chamber, provides a restriction and, as the fluid passes from the bore, it tends to expand. The flaring contour of the bore permits the fluid to begin its expansion immediately upon entering the bore and, thus, expansion of said fluid is directed away from the upper end or seat 18 of the member 16. After passing through the bore, the fluid flows to the space, or chamber, B below the member 16, after which it enters the outlet line 14.

For controlling the volume of flow through the bore 17 of the seat member and thereby controlling the volume and pressure in the outlet line 14, an elongate pin or valve member 19 has its lower end movable axially of the bore 17. The pin 19 is provided with a conical tip 20 which is complementary to and which is arranged to engage the bevelled seat 18 of the seat member. Due to the conical tip of the pin, it will be manifest, as the pin moves with relation to the seat 18, that the volume of flow through the bore 17 is regulated or controlled. The upper end of the pin or member is movable within a vertical cylinder 21 which has its lower end screw-threaded into the upper end of the vertical bore 11 of the body 10.

A transverse partition 22 extends across the cylinder 21 intermediate its ends so as to provide a cylinder 23 thereabove. The upper end of the cylinder 23 is enlarged to form a larger cylinder 24 and the upper end of the latter cylinder is closed by a suitable dome or cap 25 which is bolted thereto. A suitable packing gasket 26 is interposed between the cylinder 24 and the cap 25. It is noted that although the cylinders 21, 23 and 24 have been shown as integral, these cylinders may be made separately and screw-threaded, or otherwise secured, together. The upper portion of the cylinder 21 is provided with a lateral vent opening or port 21', whereby the upper end of said cylinder is open to the atmosphere.

The upper end of the pin or valve member 19, which is movable within the cylinder 21, is tapped to receive the lower end of a piston rod 27 which is screw-threaded thereinto. The piston rod, having a circular disk 28 made integral therewith adjacent its lower end, extends axially through the cylinders 21 and 23 and into the larger cylinder 24. A flexible, annular piston 29 surrounds the lower end of the rod 27, being confined between the upper end of the valve member 19 and a plate 30 which engages the lower surface of the disk 28, and being of such diameter that its outer periphery engages the wall of the cylinder 21. The lower end or surface of the piston is formed with an annular recess 31 which is arced or concave in cross-section and which is complementary to an annular ridge 32 formed on the upper end of the member 19 so as to provide an annular downwardly curved lip on the lower peripheral edge of said piston. Thus, when fluid pressure within the chamber A acts against the piston, said lip is positively distorted into sealing engagement with the wall of the cylinder and leakage of pressure past the piston is prevented.

A second flexible, annular piston 33, similar to the piston 29, is disposed within the cylinder 23 so as to surround the rod 27 and is seated upon a plate 34 which is supported by the partition 22. It is pointed out that the piston 33 remains stationary within its cylinder 23 and that the rod 27 is arranged to slide therethrough. The upper end of the piston may be dished as shown at 35.

A piston 36 is slidably mounted within the cylinder 24 and is secured to the upper end of the rod 27. The piston includes an axial, metallic core 37 which has a central, annular flange 37' made integral therewith and which has a flexible, annular collar 38 surrounding each end thereof. The inner end of each collar engages the flange 37', while its outer end is dished to provide an annular lip 38' at its outer periphery. The collars and flange are of such diameters that their outer surfaces engage the wall of the cylinder 24. The upper end of the piston 36 is subjected to the pressure of the fluid in the chamber B, which pressure fluid is conducted to the upper end of the cylinder 24 by a conductor 39. The lower end of the conductor 39 is screw-threaded into a lateral port 40 provided in the body 10 below the seat member 16, while the upper end of said conductor is axially screw-threaded into the dome or cap 25 which closes the upper end of the cylinder 24. A suitable manually-operated control valve 41 is connected in the conductor 39 for manually controlling the flow therethrough. Also a pressure gauge 42 is connected in said conductor between the valve and the cylinder 24 to indicate the pressure acting on the piston 36.

From the foregoing, it will be seen that the pin or valve member 19 is carried by the piston rod 27 which is secured to the pistons 29 and 36, whereby when said pistons are moved in their respective cylinders, the valve member is moved with relation to the valve seat 18 of the seat member 16. The upper end of the larger piston 36 is constantly exposed to the pressuire within the chamber B through the conductor 39, while the lower end of the piston 29 is exposed to the pressure in the chamber A. Since the cross-sectional area of the upper piston is greater than the cross-sectional area of the lower piston, it is manifest that a lower pressure above the piston 36 will balance a greater pressure acting below the lower piston. The pressure differential necessary to move the pistons is controlled by the ratio of the cross-sectional areas of the pistons to each other and, by varying these areas, different pressure differentials may be set up.

To increase the range of pressures under which the pistons may operate, an annular inflatable member 43, of rubber, fabric or other suitable resilient material, is disposed within the lower end of the large cylinder 24. The outer periphery of the member 43 is provided with a pair of diametrically opposed openings through which extend a pair of small pipes or tubes 44, as is clearly shown in Figure 3. The pipes communicate with the interior of the member and have their inner ends flared or flattened so as to engage and lie contiguous to the inner surface of said member. An annular ring 45, of rubber, or other suitable material and having its outer periphery curved or arced, surrounds each pipe 44 and has its inner end made integral with or secured to the outer periphery of the member 43. The pipes 44 are arranged to be received by a pair of enlarged openings provided in the wall of the cylinder 24, each opening being provided with an annular bushing 46 which has its bore flared outwardly toward its inner end. Thus, when the member 43 is in position within the lower end of the cylinder 24, the outer curved surface of each ring 45 will engage and seat within the flared bore of each bushing 46. The upper surface of the inflatable member engages the dished end 38' of the lower collar 38 of the piston 36, while the lower surface of the member is supported by the annular lower end of the cylinder 24 which is bevelled at 24'. One of the small pipes 44 is connected to the conductor 39 and has a manually operated control valve 47 mounted therein for manually controlling the flow through said pipe to the inflatable member. The other pipe 44 is also provided with a manual valve 48 and is connected to a pressure gauge 49 which indicates the pressure acting upon the inflatable member. It is pointed out that the member 43 surrounds the piston rod 27 and has its inner periphery normally spaced therefrom by a pair of conical packing rings 50. The member 43 is arranged to be inflated by the pressure within the chamber B through the conductor 39 and pipe 44 and, manifestly, the expansion of said member tends to raise the piston 36, whereby the piston rod 27 is moved upwardly against the pressure acting on the upper end of said piston. With such arrangement, the pressure within the member 43 is added to the fluid pressure acting against the lower piston 29 to urge the piston rod upwardly. It is noted that, if desired, the inflatable member could be eliminated, whereby the lower end of the piston 36 would be exposed to a portion of the pressure within the chamber B. In either event, the pressure differential required to move the piston may be varied by manipulating the manual control valve 47.

In operation, it will be assumed that there is no pressure in the lines 13 and 14 and also that the member 43 is deflated. With such a condition, the valve member 19, together with the piston rod 27 and the pistons 29 and 36 carried thereby, are in a lowered position, the weight of these parts holding them in such position. The bevelled surface 20 of the valve member is engaging the bevelled seat 18 of the seat member 16, whereby the bore 17 of said valve seat is closed. When a pressure is turned into the line 13, the pressure fluid will, of course, flow into the chamber A above the seat member 16. The pressure of this fluid will act against the valve member 19 and also against the lower piston 29 and will move this piston upwardly in its cylinder 21. The upward movement of the piston 29, obviously, will lift the valve member 19 upwardly off of the seat 18, whereby the fluid may flow through the seat member and into the chamber B, as well as into the outlet line 14. The pressure from the chamber B, which is less than the pressure in the chamber A due to the pressure drop across the orifice, will enter the conductor 39, flowing past the open valve 41, and into the upper end of the enlarged cylinder 24. This pressure will act downwardly on the piston 36 and will tend to move the valve member back onto its seat. Since the cross-sectional area of the lower piston 29 is smaller than the cross-sectional area of the piston 36, it will be obvious that a predetermined proportion of the pressure in the chamber A will move the valve member downwardly. The exact pressure necessary in the cylinder 24 to move the valve member downwardly toward its seat is determined by the ratio between the cross-sectional areas of the two pistons.

When this predetermined pressure has built up in the upper end of the cylinder 24, the valve member will be moved downwardly toward its seat, and as soon as a balance between the pressure in the chamber A and the pressure in the cylinder 24 is obtained, said valve becomes stationary. Manifestly, this balance of pressure is determined by the size of the pistons 29 and 36. By varying the size of the pistons, the balance may be varied. When the balance of pressure is obtained, a constant flow of fluid past the valve member is had, whereby a constant pressure is maintained in the line 14. Obviously, if the pressure in the chamber B is varied, a change in the position of the valve member occurs. In this manner, a constant pressure may be maintained in the line 14.

If it is desired to vary the pressure differential necessary to impart movement to the valve member 19, it is only necessary to open the valve 47 so as to direct a portion of the pressure to the inflatable member 43. This pressure within the member 43 is added to the pressure in the chamber A, which urges the piston rod and valve member upwardly. When a greater pressure is introduced into the member, a greater pressure must be built up in the cylinder 24 above the piston 36 in order to move the same downwardly. Since the pressure in the cylinder 24 is the same as the pressure in the line 14, it will be obvious that the pressure in the line 14 is maintained to a higher degree. Reduction of the pressure within the member 43 will, of course, lower the maintained pressure in the line 14. It is again pointed out that the use of the inflatable member increases the range of pressure under which the device may operate.

If desired, the inflatable member 43 and its conical packing rings 50 may be entirely eliminated, in which case the pressure differential may be varied by directing a portion of the pressure within the chamber B into the lower end of the cylinder 24 so as to act upwardly on the lower collar 38 of the piston 36. Due to the contour of the exposed ends of the stationary piston 33 and the lower collar 38, said piston and piston collar will be positively distorted into tight sealing engagement with their respective cylinder walls when pressure is introduced into the lower end of the cylinder 24. Thus, leakage of pressure past the pistons 33 and 36 is prevented with the result that the piston 36 will be urged upwardly by the pressure within the lower end of its cylinder. Therefore, it is manifest that the pressure differential necessary to impart movement to the valve member 19 may be varied by directing a portion of the pressure within the chamber B to to the underside of the cylinder 36 regardless of whether the inflatable member 43 is used or not.

It is pointed out that fluid under pressure may be sealed within the cylinder 24 and member 43 by closing the valves 41 and 47 after fluid has been introduced into the same, whereby said piston would be exposed to a constant pressure. Thus, a constant resistance would be exerted against the pressure of the fluid within the chamber A so as to reduce the pressure of the fluid flowing through the regulator a predetermined amount. Of course, the valve 41 may be left open and the valve 47 closed after the member 43 has been suitably inflated, whereby a predetermined constant pressure is provided for aiding in the opening of the valve member 19.

A lateral port 51, identical to the port 40, is provided in the body 10 above the valve seat member 16 so as to communicate with the chamber A. This port is screw-threaded and is normally closed by a plug 52 so as to prevent the escape of pressure. If desired, the lower end of the conductor 39 may be screw-threaded into the port 51 and the port 40 closed by the plug 52, whereby the upper side of the piston 36 is subjected to the pressure of the fluid within the chamber A instead of the pressure of the fluid within the chamber B. With this arrangement, a greater reduction of pressure will be had due to the difference in cross-sectional area of the pistons 36 and 29. When the pistons are actuated by the same pressure, it is obvious that only a very small portion of the pressure acting upon the piston 36 will balance the pressure acting against the lower piston. Therefore, the valve member will not be lifted off of its seat until some of the pressure is directed to the underside of the cylinder 36 as well as its upper side. It will be apparent that with the cylinder exposed to the unreduced pressure of the fluid that the desired result may be obtained by adding the pressure within the member 43 to the pressure which is exerted against the piston 29. It is again pointed out that the chief advantage of this arrangement is that a greater reduction of pressure could be obtained.

A pair of radial openings or recesses 53 are provided in the valve member 19 adjacent its upper end are normally closed by set screws 54 which have their outer ends flush with the external surface of said member. The openings are screw-threaded and have their inner ends communicating with the tap portion of the member 19, whereby the inner ends of the set screws engage the rod 27 so as to prevent rotation of said member with relation to said rod. By removing the screws 54, the openings 53 may be engaged by a suitable tool (not shown) for the purpose of tightening the valve member 19 with relation to the rod 27. This tightening or raising of the valve member distorts the piston 29 into tighter sealing engagement with the wall of the cylinder 21, whereby said piston tends to resist upward movement of the valve member and piston rod due to its frictional engagement with the cylinder wall. With this arrangement, a greater pressure must be exerted against the underside of the piston 29 before the valve member will be raised from its seat. When a predetermined pressure is built up within the chamber A sufficient to overcome the frictional engagement of the piston 29 with its cylinder wall, said piston will be rapidly moved upwardly to lift the valve member with a snap action. The pressure will then flow into the chamber B and through the conductor 39 to the upper end of the cylinder 24. The pressure of this fluid will act downwardly on the piston 36 and when a predetermined pressure is built up so as to overcome the frictional engagement of the piston 26 with its cylinder, the piston 36 will be forced downwardly to close the valve with a snap action. Thus, the valve remains closed until a predetermined pressure is built up to quickly open the same and then remains open until the pressure above the cylinder 36 reaches a predetermined point at which time said valve will be rapidly closed. Obviously, with the valve member 19 adjusted to this position, the regulator may be used as a surface intermitter so as to intermit the flow of fluid therethrough. Of course, after the member has been adjusted, the set screws 54 are again inserted within their openings.

If desired, the supply line 13 and outlet line 14 may be reversed, whereby fluid enters the chamber B and then flows upwardly through the bore 17 of the seat member 16, past the pin or valve member 19, into the chamber A and out through the port 12. The conductor 39 is connected in the port 51 so as to communicate with the chamber A, while the plug 52 closes the port 40. With this arrangement, the conical tip 20 of the valve member is exposed to the pressure within the chamber B, while the upper end of the piston 36 is exposed to the pressure within the chamber A through the conductor 39. Since the cross-sectional area of the piston 36 is much greater than the cross-sectional area of the tip 20, it is apparent that a very low pressure above said piston will balance or overcome an extremely high pressure acting against said tip. Thus, the regulator may be used to control the flow of fluids, carbon dioxide, or other gas which might cause freezing, since there would be only a slight or minimum reduction in pressure of the fluid when said regulator is used in this manner. Obviously, the regulator is adapted to be used in various ways and will perform efficiently at all times.

It is pointed out that the construction of the device is simple and may be readily disassembled for replacement or repair. The cylinders 21, 23 and 24 may be readily unscrewed from the body and the pistons 29, 33 and 36 removed therefrom without a great deal of trouble. The valve member 16 is substantially flush with the lower end of the port 12 through which the pressure fluid enters and the danger of an accumulation on said member is thereby eliminated. The movable pistons 29 and 36 and the stationary piston 33 are constructed so as to be distorted to a tight sealing engagement with their respective cylinder walls when a pressure is applied thereto and, by such arrangement, the use of rings or packing elements is unnecessary. The gauge 49, which is connected to the inflatable member 42, indicates the pressure exerted upon said member, while the gauge 42 which is connected in the conductor 39 not only indicates the pressure acting downwardly on the piston 36, but also indicates the pressure in the outlet line 14, since the conductor communicates directly with said line through the chamber B.

The foregoing description of the invention is explanatory thereof and various changes in the size, shape and materials, as well as in the details of the illustrated construction, may be made, within the scope of the appended claims, without departing from the spirit of the invention.

What I claim and desire to secure by Letters Patent is:

1. A pressure regulator including, a body having a passage extending therethrough, the passage having a restriction therein, means movable with relation to said restriction for controlling the flow therethrough, means actuated by the differential in pressures on opposite sides of said restriction and connected with the control means for moving the same, said latter means being spaced apart from the passage of the body so as to be unexposed to the main flow through said passage, and flexible means actuated by pressure for varying the pressure differential which actuates said control means.

2. A pressure regulator including, a body having a passage, a restriction intermediate the ends of the passage whereby a chamber is formed between the restriction and the inlet side of the passage and a second chamber is formed between said restriction and the outlet side of said passage, valve means movable with relation to the restriction for controlling the flow therethrough, means for actuating the valve means by the differential in pressures in the chambers on opposite sides of the restriction, and flexible pressure responsive means for varying the pressure differential which actuates the last named means.

3. A pressure regulator including, a body having a flow passage, a valve seat having a restricted opening therethrough mounted within the passage intermediate the ends thereof, valve means movable with relation to the seat for controlling the flow therethrough, a piston means having its opposite sides exposed to the pressure on opposite sides of the valve seat, whereby the differential in such pressures controls the movement of the valve means, and flexible pressure responsive means associated with the piston means for varying the differential in said pressures.

4. A pressure regulator including, a body having a flow passage, a valve seat having a restricted opening therethrough mounted within the passage intermediate the ends thereof, valve means movable with relation to the seat for controlling the flow therethrough, a cylinder mounted on the body and having one end communicating with the passage on the inlet side in advance of the valve seat and having its opposite end communicating with the passage on the outlet side thereof beyond the valve seat, a piston means connected to the valve means and movable within the cylinder, whereby the piston is actuated by the differential in pressures on opposite sides of the valve seat, said piston means exposing different cross-sectional areas at each end to the pressure acting thereagainst, whereby the pressure differential necessary to actuate the piston means is controlled by the ratio of said cross-sectional areas, and flexible pressure responsive means associated with the piston means for varying the pressure differential which actuates said piston means.

5. A pressure regulator including, a body having a flow passage, a valve seat having a restricted opening therethrough mounted within the passage intermediate the ends thereof, valve means movable with relation to the seat for controlling the flow therethrough, a piston means for actuating the valve means and exposing different cross-sectional areas at each end to the pressure whereby the ratio of said cross-sectional areas controls the movement of the valve means, and flexible, elastic pressure responsive means associated with the piston means to urge the same in one direction so as to vary the pressure necessary to move said piston means in an opposite direction.

6. A pressure regulator including, a body having a flow passage, a valve seat having a restricted opening therethrough mounted within the passage intermediate the ends thereof, valve means movable with relation to the seat for controlling the flow therethrough, a cylinder having its lower end communicating with the flow passage, a piston movable in the cylinder and connected to the valve means, said piston having its lower end exposed to the pressure in said passage, a second cylinder of larger diameter than the first cylinder above said first cylinder, a piston movable in the second cylinder and connected with the first piston, the upper end of the large piston being also exposed to the pressure within the flow passage, whereby the ratio of the cross-sectional areas of said pistons controls the movement of the valve means, and resilient, flexible pressure responsive means beneath the large piston for urging the same upwardly so as to vary the pressure necessary to move said pistons and valve means downwardly.

7. A pressure regulator including, a body having a flow passage, a valve seat having a restricted opening therethrough mounted within the passage intermediate the ends thereof, valve means movable with relation to the seat for controlling the flow therethrough, a cylinder having its lower end communicating with the flow passage, a piston movable in the cylinder and connected to the valve means, said piston having its lower end exposed to the pressure in said passage, a second cylinder of larger diameter than the first cylinder above said first cylinder, a piston movable in the second cylinder and connected with the first piston, the upper end of the large piston being also exposed to the pressure within the flow passage, whereby the ratio of the cross-sectional areas of said pistons controls the movement of the valve means, and resilient means beneath the large piston having elastic walls for confining a pressure fluid to urge said large piston upwardly so as to vary the pressure necessary to move said pistons and valve means downwardly.

8. A pressure regulator including, a body having a flow passage, a valve seat having a restricted opening therethrough mounted within the passage intermediate the ends thereof, valve means movable with relation to the seat for controlling the flow therethrough, a piston means actuating the valve means and exposing different cross-sectional areas at each end to the pressure whereby the ratio of said cross-sectional areas control the movement of the valve means, and an inflatable flexible member associated with the piston means and actuated by the pressure to urge the same in one direction so as to vary the pressure necessary to move said piston means in an opposite direction.

9. A pressure regulator including, a body having a flow passage, a valve seat having a restricted opening therethrough mounted within the passage intermediate the end thereof, valve means movable with relation to the seat for controlling the flow therethrough, a cylinder having its lower end communicating with the flow passage, a piston movable in the cylinder and connected to the valve means, said piston having its lower end exposed to the pressure in said passage, a second cylinder of larger diameter than the first cylinder and above said first cylinder, means for conducting the pressure within the flow passage to the upper end of the second cylinder, a piston movable in said second cylinder and connected with the first piston, the upper end of the large piston being exposed to the pressure in said passage, whereby the ratio of the cross-sectional areas of said pistons controls the movement of the valve means, the conducting means being so arranged that the pressure in the passage may be exerted against the lower end as well as the upper end of said piston so as to vary the pressure necessary to move the pistons and valve means, said pistons being resilient so as to seal off the bores of their respective cylinders when exposed to the pressure within the flow passage, and an inflatable resilient annular tube beneath the large piston and having connection with said conducting means for urging said piston upwardly so as to vary the pressure necessary to move the pistons and valve means downwardly.

10. A pressure regulator including, a body having a passage extending therethrough, the passage having a restriction therein, means movable with relation to said restriction for controlling the flow therethrough, means actuated by the differential in pressures on opposite sides of said restriction and connected with the control means for moving the same, and an expansible annular tube associated with the pressure differential-actuated means for varying the pressure differential which actuates the control means.

DAVID H. WALTON.